(12) United States Patent
Feng et al.

(10) Patent No.: US 10,460,172 B2
(45) Date of Patent: Oct. 29, 2019

(54) METHOD AND APPARATUS FOR LABELING POINT CLOUD DATA

(71) Applicant: BEIJING BAIDU NETCOM SCIENCE AND TECHNOLOGY CO., LTD., Beijing (CN)

(72) Inventors: Kaiwen Feng, Beijing (CN); Zhuo Chen, Beijing (CN); Bocong Liu, Beijing (CN); Chengliang Deng, Beijing (CN); Yibing Liang, Beijing (CN); Yu Ma, Beijing (CN)

(73) Assignee: Beijing Baidu Netcom Science And Technology Co., Ltd, Beijing (CN)

( * ) Notice: Subject to any disclaimer, the term of this patent is extended or adjusted under 35 U.S.C. 154(b) by 0 days.

(21) Appl. No.: 15/409,667

(22) Filed: Jan. 19, 2017

(65) Prior Publication Data

US 2018/0075666 A1   Mar. 15, 2018

(30) Foreign Application Priority Data

Sep. 14, 2016   (CN) .......................... 2016 1 0827012

(51) Int. Cl.
*G06K 9/00* (2006.01)
*G06T 19/00* (2011.01)

(52) U.S. Cl.
CPC ...... *G06K 9/00671* (2013.01); *G06K 9/00711* (2013.01); *G06K 9/00* (2013.01); *G06T 19/00* (2013.01); *G06T 2207/10028* (2013.01); *G06T 2219/004* (2013.01)

(58) Field of Classification Search
None
See application file for complete search history.

(56) References Cited

U.S. PATENT DOCUMENTS

| 5,588,098 A * | 12/1996 | Chen ................... G06F 3/04845 345/653 |
| 7,636,450 B1 * | 12/2009 | Bourdev ........... G06F 17/30256 382/100 |
| 9,097,800 B1 * | 8/2015 | Zhu ........................ G01S 13/865 |
| 2009/0196349 A1 * | 8/2009 | Park .......................... G06T 7/12 375/240.12 |
| 2014/0104266 A1 * | 4/2014 | Stone ....................... G06F 17/50 345/419 |
| 2015/0086133 A1 * | 3/2015 | Grady ............... G06F 17/30268 382/278 |
| 2017/0091597 A1 * | 3/2017 | Wolfram ............ G06K 9/00442 |
| 2017/0109611 A1 * | 4/2017 | Luo ....................... G06K 9/6293 |

(Continued)

FOREIGN PATENT DOCUMENTS

| CN | 103955920 | 7/2014 |
| CN | 103971415 | 8/2014 |

*Primary Examiner* — Justin P. Misleh
(74) *Attorney, Agent, or Firm* — Miller, Matthias & Hull LLP

(57) ABSTRACT

The present application discloses a method and an apparatus for processing point cloud data. The method of an embodiment comprises: recognizing an object in a to-be-labeled point cloud frame by using an obstacle recognition algorithm, to obtain a recognition result; presenting the recognition result as an initial labeling result of the point cloud frame; and updating the labeling result in response to a correction operation by a user on the labeling result. According to the embodiment, the speed and accuracy of point cloud data labeling are improved.

18 Claims, 6 Drawing Sheets

(56) References Cited

U.S. PATENT DOCUMENTS

2018/0012082 A1\* 1/2018 Satazoda ............ G06K 9/00805
2018/0031364 A1\* 2/2018 Kallay .................. G01B 11/02
2018/0068067 A1\* 3/2018 Bronkalla ............. G06F 19/321

\* cited by examiner

METHOD AND APPARATUS FOR LABELING POINT CLOUD DATA

CROSS-REFERENCE TO RELATED APPLICATION

This application is related to and claims priority from Chinese application No. 201610827012.0, filed on Sep. 14, 2016, entitled "Method and Apparatus for Processing Point Cloud Data", the entire disclosure of which is hereby incorporated by reference.

TECHNICAL FIELD

The present application relates to the field of computer technology, in particular, to the field of data processing technology, and more particularly, to a method and an apparatus for processing point cloud data.

BACKGROUND

To optimize an obstacle recognition algorithm for point cloud data, a large amount of correctly labeled point cloud data is needed to serve as training samples. In addition, to verify the effect of the recognition algorithm, a large amount of correctly labeled point cloud data is also needed to verify the recognition result. Therefore, a large amount of point cloud data in different scenarios needs to be acquired, and correctly labeled, to facilitate training of the algorithm and verification of the recognition result. To ensure the correctness of the sample data, the labeling process is generally implemented as an entirely manual process in the prior art.

However, in a point cloud image, the point cloud is shown as points in a three-dimensional space, and surrounding object characteristics are sometimes not intuitive or obvious. Meanwhile, further affected by the ground and other roadside sundries, the object characteristics are relatively difficult to be recognized with human eyes and easily cause visual fatigue, resulting in low labeling efficiency.

SUMMARY

An objective of the present application is to provide a method and an apparatus for processing point cloud data, to solve the technical problems mentioned in the background.

In the first aspect, the present application provides a method for processing point cloud data, and the method includes: recognizing an object in a to-be-labeled point cloud frame by using an obstacle recognition algorithm, to obtain a recognition result; presenting the recognition result as an initial labeling result of the point cloud frame; and updating the labeling result in response to a correction operation by a user on the labeling result.

In some embodiments, the presenting the recognition result as an initial labeling result of the point cloud frame includes: adding a border to a recognized object in the point cloud frame; and presenting object type information recognized for the recognized object.

In some embodiments, the updating the labeling result in response to a correction operation by a user on the labeling result includes: updating, in response to an adjusting operation of the user on the border, the labeling result according to the adjusted border.

In some embodiments, the updating the labeling result in response to a correction operation by a user on the labeling result further includes: updating, in response to a checking operation of the user on the object type information, the labeling result according to the checked object type information.

In some embodiments, the method includes: training the obstacle recognition algorithm by using the updated labeling result as sample data, to update the obstacle recognition algorithm.

In some embodiments, after the training the obstacle recognition algorithm by using the updated labeling result as sample data, to update the obstacle recognition algorithm, the method further includes: recognizing the object in the to-be-recognized point cloud frame by using the updated obstacle recognition algorithm.

In the second aspect, the present application provides an apparatus for processing point cloud data, and the apparatus includes: a recognizing unit, configured to recognize an object in a to-be-labeled point cloud frame by using an obstacle recognition algorithm, to obtain a recognition result; a presenting unit, configured to present the recognition result as an initial labeling result of the point cloud frame; and an updating unit, configured to update the labeling result in response to a correction operation by a user on the labeling result.

In some embodiments, the presenting unit is further configured to: add a border to a recognized object in the point cloud frame; and present object type information recognized for the recognized object.

In some embodiments, the updating unit includes: a border adjusting sub-unit, configured to update, in response to an adjusting operation of the user on the border, the labeling result according to the adjusted border.

In some embodiments, the updating unit further includes: a checking sub-unit, configured to update, in response to a checking operation of the user on the object type information, the labeling result according to the checked object type information.

In some embodiments, the apparatus includes: an algorithm updating unit, configured to train the obstacle recognition algorithm by using the updated labeling result as sample data, to update the obstacle recognition algorithm.

In some embodiments, the apparatus further includes: a point cloud recognizing unit, configured to recognize the object in the to-be-recognized point cloud frame by using the updated obstacle recognition algorithm.

The method and apparatus for processing point cloud data provided in the present application assist the manual labeling on a point cloud frame by using an existing obstacle recognition algorithm, thereby reducing the workload of the manual labeling, and improving the labeling speed and accuracy.

BRIEF DESCRIPTION OF THE DRAWINGS

After reading detailed descriptions of non-limiting embodiments with reference to the following accompanying drawings, other features, objectives and advantages of the present application will be more apparent.

DETAILED DESCRIPTION OF EMBODIMENTS

The present application is further described in detail through the accompanying drawing and the embodiment. It should be understood that, the specific embodiments described herein are merely used to explain the relevant invention, and are not intended to limit the present invention. In addition, it should be further noted that, in order to facilitate the description, merely the parts related to the relevant invention are shown in the accompanying drawings.

It should be noted that, the embodiments of the present application and features in the embodiments may be combined on a non-conflict basis. The present application will be described in detail through the accompanying drawings and the embodiments.

Figure 1:
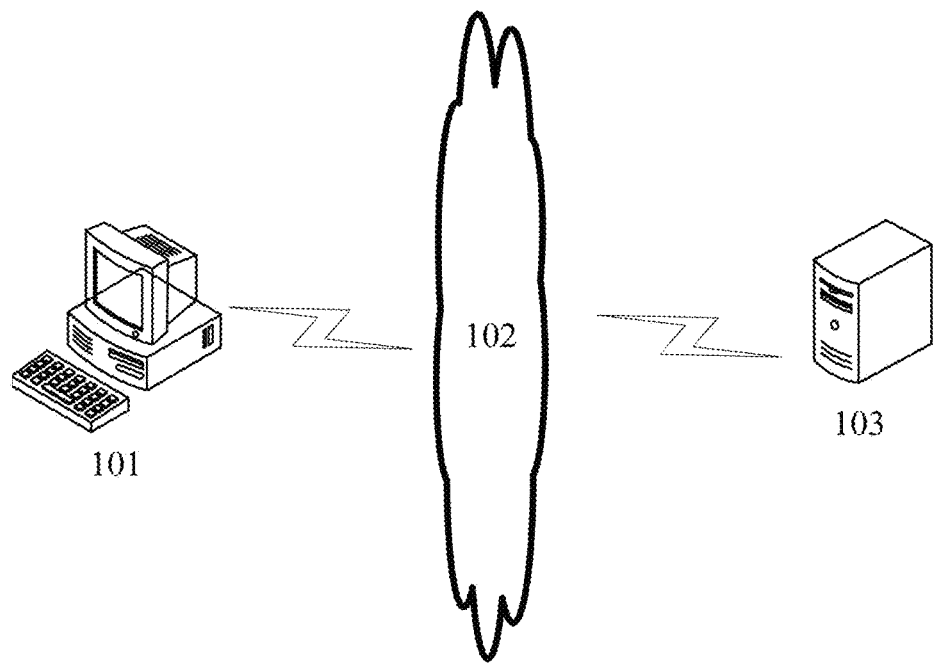
FIG. 1 is a diagram showing an exemplary system architecture in which the present application can be applied.

FIG. 1 shows an exemplary system architecture 100 of an embodiment to which the method or apparatus for processing point cloud data of this application can be applied.

As shown in FIG. 1, the system architecture 100 may comprise a terminal device 101, a network 102 and a server 103. The network 102 is used for providing a communication link medium between the terminal device 101 and the server 103. The network 102 may comprise various connection types, for example, wired and wireless communication links or optical fiber cables and the like.

The terminal device 101 may be various electronic devices with displays and supporting cloud visual tools to be executed, including but not limited to a laptop computer, a desktop computer and the like. The terminal device 101 may be installed with various communication client applications, such as a cloud visual tool and the like. Users may use the terminal device 101 to interact with the server 103 via the network 102 to receive or transmit message and the like.

The server 103 may be a server (such as a background server which provides support for information displayed on the terminal device) which provides various services. The background server can process (for example, analyze) the received data, and provide the processing result to the terminal device as feedback.

It is important to note that the method for processing point cloud data provided in embodiments of this application is executed by the server 103 in general, and accordingly, the apparatus for processing point cloud data is arranged in the server 103 in general.

It should be understood that the number of terminal device(s), network(s) and server(s) in FIG. 1 is only illustrative. There may be any number of terminal device(s), network(s) and server(s) according to implementation needs. Continue to refer to FIG. 2, a process 200 of an embodiment of a method for processing point cloud according to the present application is shown. The method for processing point cloud data includes the following steps:

Step 201: An object in a to-be-labeled point cloud frame is recognized by using an obstacle recognition algorithm, to obtain a recognition result.

In this embodiment, an electronic device (for example, the terminal device shown in FIG. 1) on which the method for processing point cloud data runs may recognize a to-be-labeled point cloud frame by using an obstacle recognition algorithm for a point cloud, to recognize an object in the point cloud frame to obtain a recognition result. The obstacle recognition algorithm may be various algorithms for conducting obstacle recognition on the point cloud data, including but not limited to a three-dimensional point cloud segmentation-based binocular visual obstacle detection method, a binocular stereo visual-based obstacle detection algorithm, and the like; the specific implementations of the algorithms are not specifically described herein.

In some optional implementation manners of this embodiment, the foregoing step 202 may include: adding a border to a recognized object; and presenting object type information recognized for the recognized object in the labeling result. In this implementation manner, the recognition result obtained by recognizing the point cloud frame includes an area where the recognized object in the point cloud frame is located and object type information recognized for the recognized object. When the electronic device presents the initial labeling result, a border may be added to the recognized object according to the area where the recognized object in the recognition result is located, and the object type information recognized for the recognized object in the recognition result may further be presented.

Step 202: The recognition result is presented as an initial labeling result.

In this embodiment, based on the recognition result obtained in step 201, the electronic device may use a point cloud visual tool to load the recognition result and the to-be-labeled point cloud frame, to present the recognition result as the initial labeling result on the point cloud visual tool. Generally, when the recognition result is presented, the point cloud visual tool may also be used to load the point cloud frame for presentation, and the presented point cloud frame may assist the user in correcting the labeling result in the subsequent process.

Step 203: The labeling result is updated in response to a correction operation by the user on the labeling result.

In this embodiment, the user may conduct the correction operation on the labeling result presented in step 202, and therefore, the electronic device may detect the correction operation by the user on the labeling result. When the electronic device detects the correction operation, the labeling result may be updated according to the correction operation.

In some optional implementation manners of this embodiment, step 203 includes: updating, in response to an adjusting operation of the user on the border, the labeling result according to the adjusted border. When object recognition is conducted on the point cloud frame by using the obstacle recognition algorithm, in the obtained recognition result, the area where the recognized object is located in the point cloud frame may have some errors, for example, errors in position, size or angle, compared with the area actually observed by human eyes. Therefore, in this implementation manner, the adjusting operation of the user on the border may be detected, and when the corresponding adjusting operation is detected, the labeling result may be generated according to the adjusted border. Optionally, the adjusting operation includes one or more of a translation operation, a zooming operation and a rotation operation. By means of the translation or zooming operation, an automatically labeled border may fit the object as closely as possible; by rotating the automatically labeled border, the border angle may be enabled to be as consistent as possible with the actual angle of the object.

In some optional implementation manners of this embodiment, step 203 includes: updating, in response to a checking operation of the user on the object type information, the labeling result according to the checked object type information. In the recognition result, the object type information of some objects may not be recognized or recognized incorrectly, causing the labeling result to be incorrect. Therefore, in this implementation manner, the labeling result may be submitted to the user for the checking operation. The labeling result is generated according to the checked object type information when a checking operation of the user on the object type information is detected. In this manner, the electronic device may correct information that is missed to be labeled or labeled incorrectly in the labeling result, thereby ensuring the correctness of the labeling result.

Figure 3:
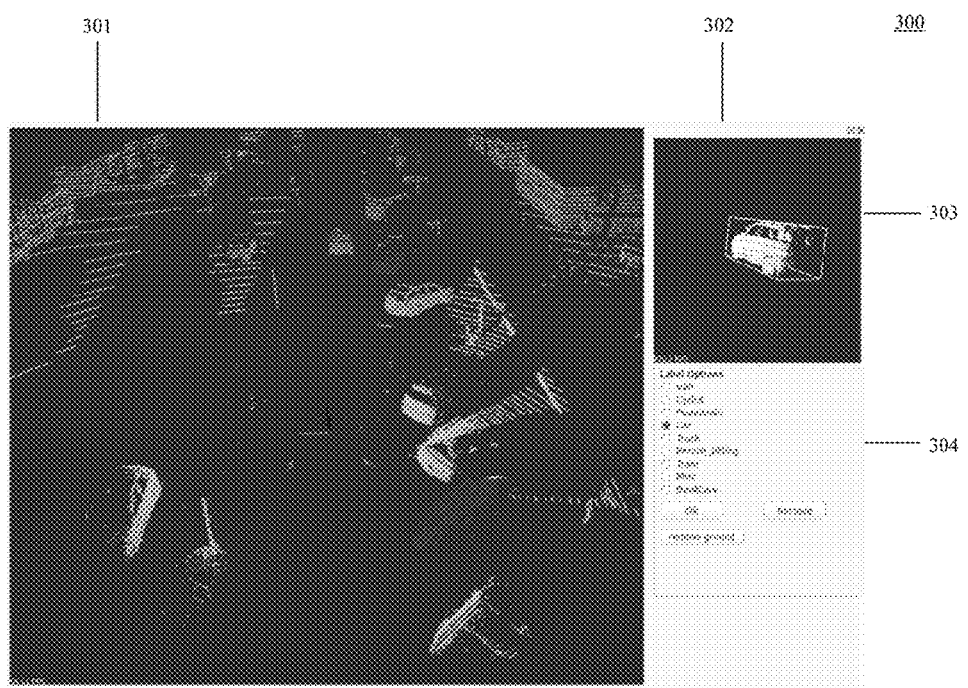
FIG. 3 is a schematic diagram of an application scenario of a method for processing point cloud data according to the present application.

Continue to refer to FIG. 3. FIG. 3 is a schematic diagram 300 of an application scenario of a method for processing point cloud data according to this embodiment. In the application scenario of FIG. 3, a to-be-labeled point cloud frame is first recognized by using an obstacle recognition algorithm, to obtain a recognition result; then, a user loads the point cloud frame and the recognition result on an electronic device by using a point cloud visual tool, and presents the recognition result as an initial labeling result, wherein a left area 301 presents the point cloud frame, and a right area 302 presents the initial labeling result generated according to the recognition result. Further, an upper area 303 of the right area 302 presents a schematic diagram of adding a border to the recognized object, and a lower area 304 of the right area 302 presents the object type information recognized for the recognized object. The object type information indicates that the object type of the recognized object may be Van, Cyclist, Pedestrian, Car, Truck, Person_sitting, Tram, Misc or DontCare. In this case, the user may adjust the border through the area 303, and may check the object type information of the recognized object through the area 304; and finally, the electronic device may update the labeling result according to the adjusted border and the checked object type information.

The method provided in the above embodiment of the present application assists the manual labeling on a point cloud frame by using an existing obstacle recognition algorithm, thereby reducing the workload of the manual labeling, and improving the labeling speed and accuracy.

Figure 4:
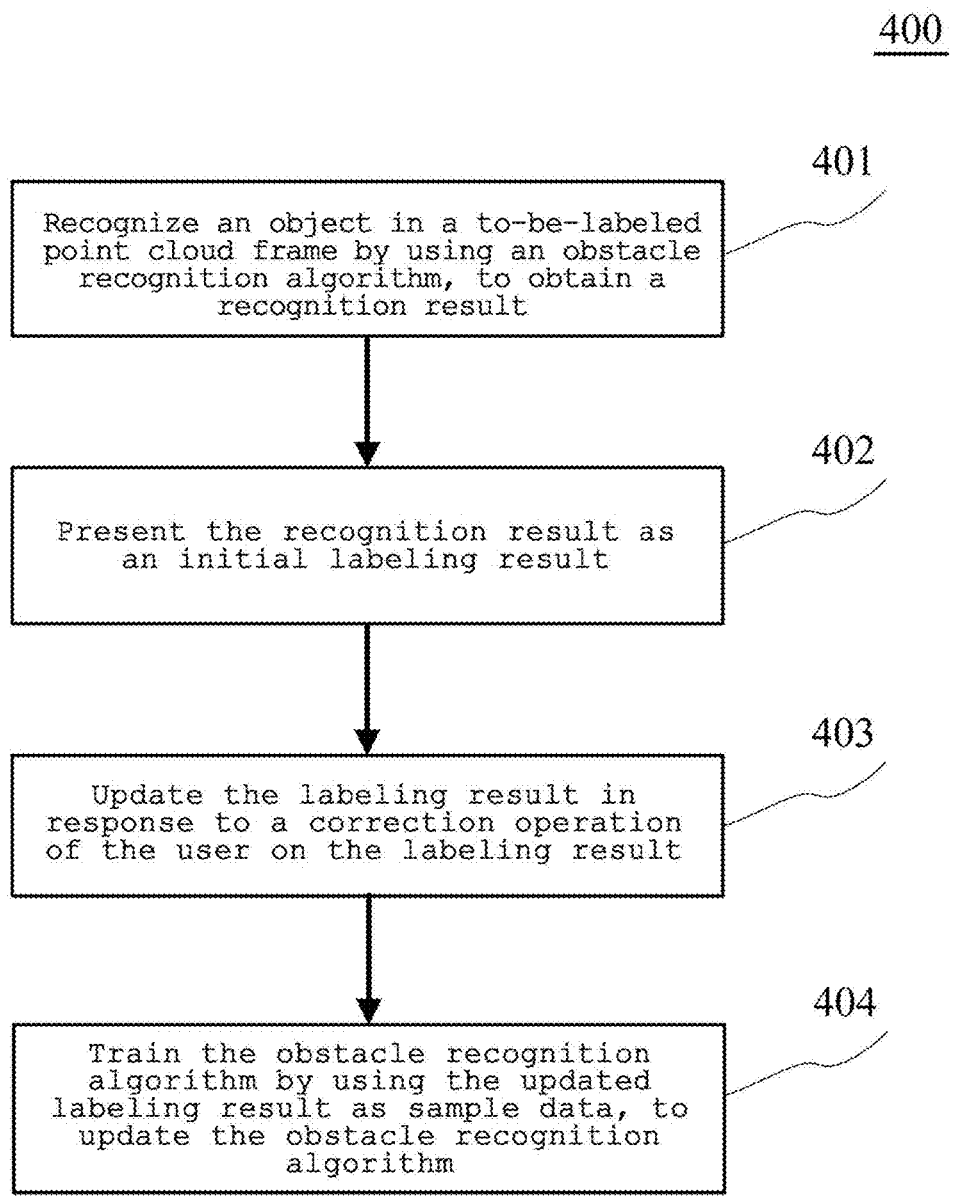
FIG. 4 is a flow chart of another embodiment of a method for processing point cloud data according to the present application.

Further referring to FIG. 4, a process 400 of another embodiment of a method for processing point cloud data is shown. The process 400 of the method for processing point cloud data includes the following steps:

Step 401: An object in a to-be-labeled point cloud frame is recognized by using an obstacle recognition algorithm, to obtain a recognition result.

Figure 2:
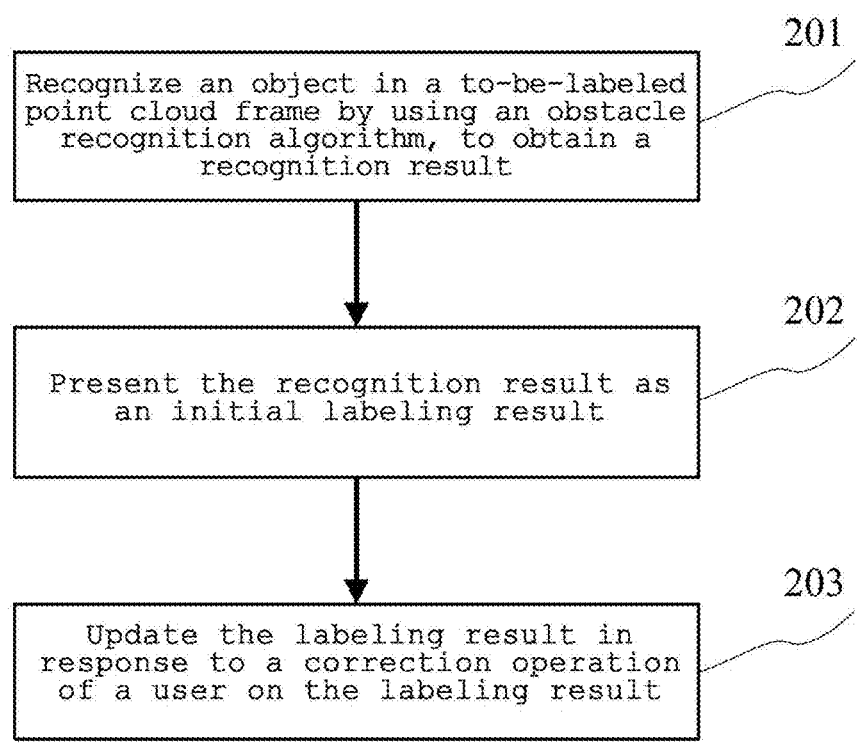
FIG. 2 is a flow chart of an embodiment of a method for processing point cloud data according to the present application.

In this embodiment, for the specific processing of step 401, reference may be made to step 201 in the corresponding embodiment of FIG. 2, and details are not repeated herein.

Step 402: The recognition result is presented as an initial labeling result of the point cloud frame.

In this embodiment, for the specific processing of step 402, reference may be made to step 202 in the corresponding embodiment of FIG. 2, and details are not repeated herein.

Step 403: The labeling result is updated in response to a correction operation by the user on the labeling result.

In this embodiment, for the specific processing of step 403, reference may be made to step 203 in the corresponding embodiment of FIG. 2, and details are not repeated herein.

Step 404: The obstacle recognition algorithm is trained by using the updated labeling result as sample data, to update the obstacle recognition algorithm.

In this embodiment, based on the updated labeling result obtained in step 403, the electronic device may use the labeling result as a training sample to train the obstacle recognition algorithm, thereby updating the obstacle recognition algorithm.

In some optional implementation manners of this embodiment, after step 404, the method further includes: recognizing the object in the to-be-recognized point cloud frame by using the updated obstacle recognition algorithm. In this implementation manner, step 404 updates the obstacle recognition algorithm, such that the updated obstacle recognition algorithm is optimized, and therefore, the optimized obstacle recognition algorithm may be used to improve the accuracy of the recognition result when the object in the to-be-recognized point cloud frame is recognized.

It can be seen from FIG. 4 that, compared with the embodiment corresponding to FIG. 2, the process 400 of the method for processing point cloud data in this embodiment emphasizes the step of updating the obstacle recognition algorithm by using the obtained labeling result, such that the update of the obstacle recognition algorithm and the labeling of the point cloud frame may be looped, the corrected labeling result may continuously optimize the obstacle recognition algorithm, and the optimized obstacle recognition algorithm can constantly improve the labeling speed and accuracy.

Figure 5:
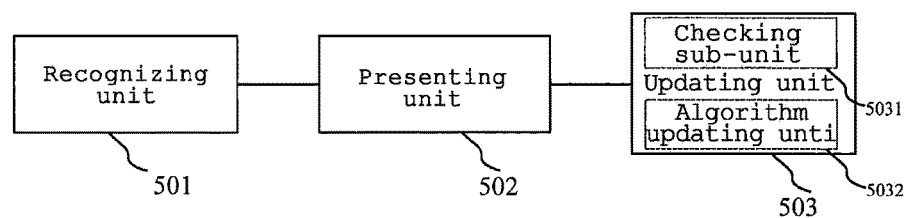
FIG. 5 is a schematic structural diagram of an embodiment of an apparatus for processing point cloud data according to the present application.

Further referring to FIG. 5, as an implementation of the methods shown in the above drawings, the present application provides an embodiment of an apparatus for processing point cloud data. The apparatus embodiment is corresponding to the method embodiment shown in FIG. 2, and the apparatus may be specifically applicable to various terminal devices.

As shown in FIG. 5, the apparatus 500 for processing point cloud data described in this embodiment includes: a recognizing unit 501, a presenting unit 502, and an updating unit 503. The recognizing unit 501 is configured to recognize an object in a to-be-labeled point cloud frame by using an obstacle recognition algorithm, to obtain a recognition result; the presenting unit 502 is configured to present the recognition result as an initial labeling result of the point cloud frame; and the updating unit 503 is configured to update the labeling result in response to a correction operation by a user on the labeling result.

In this embodiment, for the specific processing of the recognizing unit 501, the presenting unit 502 and the updating unit 503, reference may be made to step 201, step 202, and step 203 in the corresponding embodiment of FIG. 2, and details are not repeated herein.

In some optional implementation manners of this embodiment, the presenting unit 502 is further configured to: add a border to a recognized object in the point cloud frame; and present object type information recognized for the recognized object. For specific processing of this implementation manner, reference may be made to the corresponding implementation manner in the corresponding embodiment of FIG. 2, and details are not repeated herein.

In some optional implementation manners of this embodiment, the generating unit 503 includes: a border adjusting sub-unit (not shown), configured to update, in response to an adjusting operation of the user on the border, the labeling result according to the adjusted border. For the specific processing of this implementation manner, reference may be made to the corresponding implementation manner in the corresponding embodiment of FIG. 2, and details are not repeated herein.

In some optional implementation manners of this embodiment, the generating unit 503 further includes: a checking sub-unit 5031, configured to update, in response to a checking operation on the object type information by the user, the labeling result according to the checked object type information. For specific processing of this implementation manner, reference may be made to the corresponding implementation manner in the corresponding embodiment of FIG. 2, and details are not repeated herein.

In some optional implementation manners of this embodiment, the apparatus 500 further includes: an algorithm updating unit 5032, configured to train the obstacle recognition algorithm by using the updated labeling result as sample data, to update the obstacle recognition algorithm. For specific processing of this implementation manner, reference may be made to the corresponding steps in the corresponding embodiment of FIG. 4, and details are not repeated herein.

In some optional implementation manners of this embodiment, the apparatus 500 further includes: a point cloud recognizing unit (not shown), configured to recognize the object in the to-be-recognized point cloud frame by using the updated obstacle recognition algorithm. For specific processing of this implementation manner, reference may be made to the corresponding implementation manner in the corresponding embodiment of FIG. 4, and details are not repeated herein.

Figure 6:
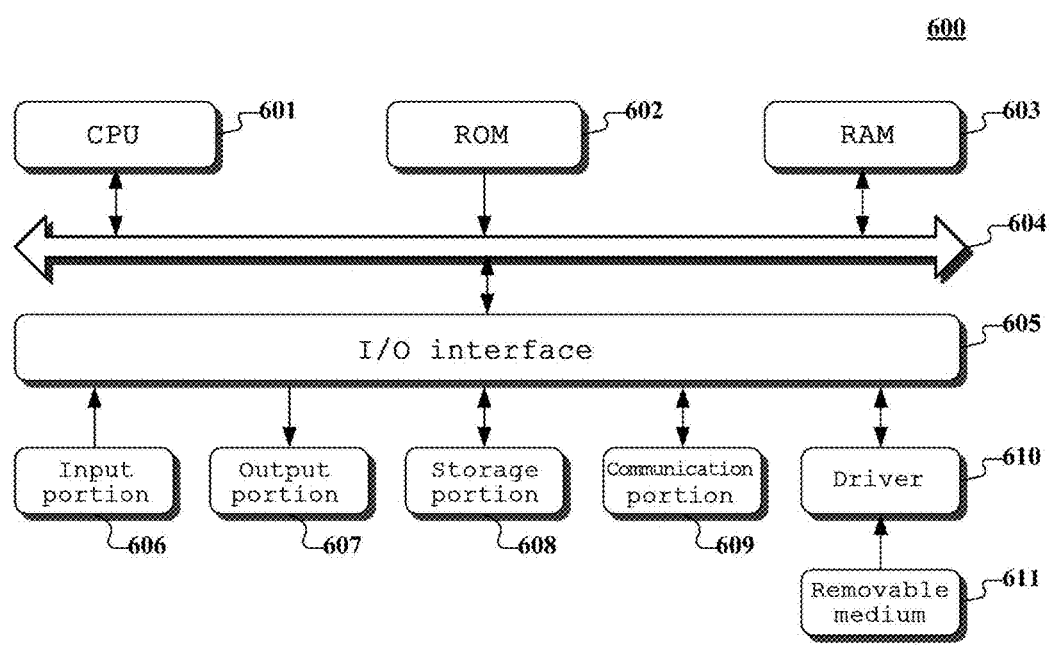
FIG. 6 is a schematic structural diagram of a computer system of a terminal device or a server applicable to implement the embodiment of the present application.

Referring to FIG. 6, a schematic structural diagram of a computer system 600 adapted to implement a terminal device or a server of the embodiments of the present application is shown.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to an embodiment of the present disclosure, the process described above with reference to the flowcharts may be implemented in a computer software program. For example, an embodiment of the present disclosure includes a computer program product, which comprises a computer program that is tangibly embedded in a machine-readable medium. The computer program comprises program codes for executing the method as shown in the flowcharts. In such an embodiment, the computer program may be downloaded and installed from a network via the communication portion 609, and/or may be installed from the removable media 611.

The flowcharts and block diagrams in the figures illustrate architectures, functions and operations that may be implemented according to the system, the method and the computer program product of the various embodiments of the present invention. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units involved in the embodiments of the present application may be implemented by way of software or hardware. The described units may also be provided in a processor, for example, described as: a processor, comprising a recognizing unit, a presenting unit and an updating unit, where the names of these units are not considered as a limitation to the units. For example, the recognizing unit may also be described as "a unit for recognizing an object in a to-be-labeled point cloud frame by using an obstacle recognition algorithm, to obtain a recognition result".

In another aspect, the present application further provides a non-transitory computer readable storage medium. The non-transitory computer readable storage medium may be the non-transitory computer readable storage medium included in the apparatus in the above embodiments, or a stand-alone non-transitory computer readable storage medium which has not been assembled into the apparatus. The non-transitory computer readable storage medium stores one or more programs. When the one or more programs are executed by a device, the device is to: recognize an object in a to-be-labeled point cloud frame by using an obstacle recognition algorithm, to obtain a recognition result; present the recognition result as an initial labeling result of the point cloud frame; and update the labeling result in response to a correction operation by a user on the labeling result.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:
1. A method for processing a point cloud frame of point cloud data, comprising:
    recognizing an object in the point cloud frame by using an obstacle recognition algorithm;

presenting an initial labeling result of the point cloud frame on a user interface of an electronic device, wherein the initial labeling result comprises the recognized object and a three-dimensional border added to the recognized object; and updating the initial labeling result in response to a correction operation by a user on the initial labeling result, wherein the correction operation comprises:

a border adjusting operation, the border adjusting operation including a translation operation, zooming operation, and rotation operation on only the three-dimensional border to fit the three-dimensional border to the recognized object with the recognized object remaining unadjusted by the border adjusting operation.

2. The method according to claim 1, wherein the correction operation further comprises:

a checking operation by the user on an object type information and updating the initial labeling result according to the checked object type information.

3. The method according to claim 1, further comprising:
training the obstacle recognition algorithm by using the updated initial labeling result as sample data, to update the obstacle recognition algorithm.

4. The method according to claim 3, further comprising:
recognizing the object in the point cloud frame by using the updated obstacle recognition algorithm.

5. The method according to claim 1, wherein presenting the initial labeling result of the point cloud frame further comprises:

synchronously and nonoverlappingly presenting, on the user interface, the point cloud frame, the recognized object labeled with the three-dimensional border, and an recognized object type information.

6. The method according to claim 5, wherein the user interface is a cloud visual tool.

7. The method according to claim 5, wherein label options for labeling object types are presented on the user interface.

8. An apparatus for processing a point cloud frame of point cloud data, comprising:

at least one processor; and a memory storing instructions, which when executed by the at least one processor, cause the at least one processor to perform operations, the operations comprising:

recognizing an object in the point cloud frame by using an obstacle recognition algorithm;

presenting an initial labeling result of the point cloud frame on a user interface of an electronic device, wherein the initial labeling result comprises the recognized object and a three-dimensional border added to the recognized object; and updating the initial labeling result in response to a correction operation by a user on the initial labeling result, wherein the correction operation comprises:

a border adjusting operation, the border adjusting operation including a translation operation, zooming operation, and rotation operation on only the three-dimensional border to fit the three-dimensional border to the recognized object with the recognized object remaining unadjusted by the border adjusting operation.

9. The apparatus according to claim 8, wherein the updating the correction operation further comprises:

a checking operation of the user on the an object type information and updating the initial labeling result according to the checked object type information.

10. The apparatus according to claim 8, wherein the operations further comprise:

training the obstacle recognition algorithm by using the updated initial labeling result as sample data, to update the obstacle recognition algorithm.

11. The apparatus according to claim 10, wherein the operations further comprise:

recognizing the object in the point cloud frame by using the updated obstacle recognition algorithm.

12. The apparatus according to claim 8, wherein presenting the initial labeling result of the point cloud frame operation further comprises:

synchronously and nonoverlappingly presenting, on the user interface, the point cloud frame, the recognized object labeled with the three-dimensional border, and an recognized object type information.

13. The apparatus according to claim 12, wherein the user interface is a cloud visual tool.

14. The apparatus according to claim 12, wherein label options for labeling object types are presented on the user interface.

15. A non-transitory storage medium storing one or more programs, the one or more programs when executed by an apparatus, causing the apparatus to perform a method for processing a point cloud frame of point cloud data, comprising:

recognizing an object in the point cloud frame by using an obstacle recognition algorithm;

presenting an initial labeling result of the point cloud frame on a user interface of an electronic device, wherein the initial labeling result comprises the recognized object and a three-dimensional border added to the recognized object; and updating the initial labeling result in response to a correction operation by a user on the initial labeling result, wherein the correction operation comprises:

a border adjusting operation, the border adjusting operation including a translation operation, zooming operation, and rotation operation on only the three-dimensional border to fit the three-dimensional border to the recognized object with the recognized object remaining unadjusted by the border adjusting operation.

16. The non-transitory storage medium of claim 15, wherein presenting the initial labeling result of the point cloud frame further comprises:

synchronously and nonoverlappingly presenting, on the user interface, the point cloud frame, the recognized object labeled with the three-dimensional border, and an recognized object type information.

17. The method according to claim 16, wherein the user interface is a cloud visual tool.

18. The method according to claim 16, wherein label options for labeling object types are presented on the user interface.

* * * * *